Aug. 4, 1953     O. O. BEYMER     2,647,533

DRAIN PLUG FOR PIPE LINES

Filed Dec. 17, 1951

OREN O. BEYMER
INVENTOR.

BY Buckhorn and Cheatham

ATTORNEYS

Patented Aug. 4, 1953

2,647,533

UNITED STATES PATENT OFFICE 2,647,533

DRAIN PLUG FOR PIPE LINES

Oren O. Beymer, Eugene, Oreg., assignor to Irrigation Equipment Co., Inc., Eugene, Oreg., a corporation of Oregon Application December 17, 1951, Serial No. 262,149

6 Claims. (Cl. 137—517)

My present invention comprises a drain plug for pipe lines, particularly portable or otherwise movable pipe lines for field sprinkling systems. Such pipe lines comprise lengths of lightweight pipe and connecting couplers in which are mounted gasket means to prevent leakage around the adjoining ends of the pipes and which comprise latching means to hold the pipes together against the pressure of the water. The portable type of irrigation sprinkling pipe line may be broken up into individual pipe lengths when it is desired to move the sprinkling system to another section of a field, and other types of pipe lines include wheels or skids whereby the entire pipe line may be rolled or dragged from one section of a field to another; either type of pipe line requiring the draining of the contained water therefrom before movement may be accomplished. For this purpose a plurality of automatically opening drain valves may be placed in the pipes or couplings at spaced intervals along the pipe line, such drain valves being closed by the pressure of the water or the movement thereof through the pipe line, and comprising spring means effective to open the valves when the pressure is relieved. The orifices through such drain valves are necessarily limited in size, hence a considerable period of time is required completely to drain the pipe line, and in many cases the end section of a pipe line cannot be drained since it may lie below the level of the next adjacent drain valve. The principal purpose of the present invention, therefore, is to expedite the draining of a pipe line in order that shifting movement thereof to a different section of a field may be more rapidly accomplished, and a further object of the present invention is to provide means whereby the end section of a pipe line may be drained regardless of whether it slopes upwardly or downwardly from the next adjacent drain valve.

A further object of the present invention is to provide a self-draining end plug for a pipe line used for any purpose.

A further object of the present invention is to provide a self-draining end plug for a pipe line which, in most instances, may entirely eliminate the necessity for placing drain valves along the length of the pipe line, thereby materially reducing the cost of a self-draining pipe line.

A further object of the present invention is to provide a device of the foregoing character which is made of readily obtainable materials and is of simple construction, and which may be adjusted to alter the pressure at which the valve therein opens and closes and the flow characteristics through the valve when it is opened.

The objects and advantages of the invention may be more readily ascertained by reference to the following specification taken in connection with the accompanying drawings wherein preferred embodiments of the invention are illustrated. In the specification and drawings like numerals refer to like parts throughout.

In the drawings, Fig. 1 is a vertical section, taken substantially along line 1—1 of Fig. 2, through a preferred form of the invention;

Figure 1:
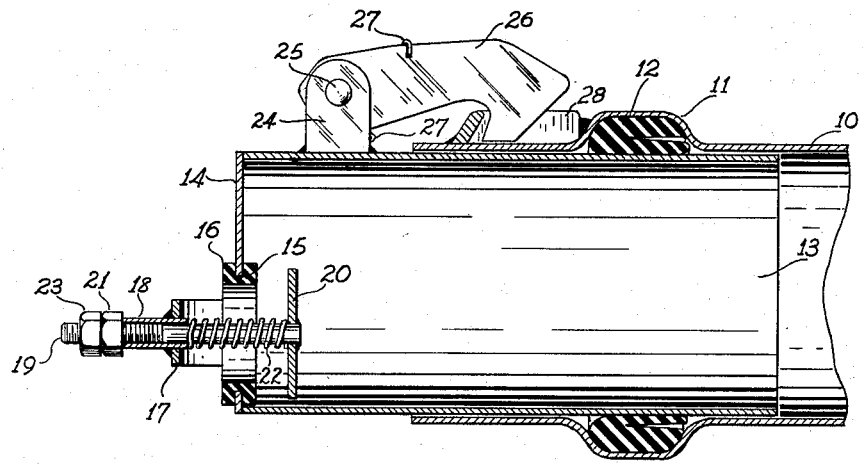
Figure 2:
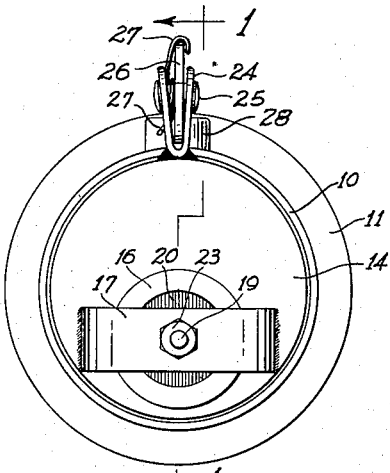
Fig. 2 is an end view of the plug illustrated in Fig. 1.

Referring to Figs. 1 and 2, there is illustrated a portion of a pipe line, the same comprising a tubular member 10 which may be the end of a section of pipe or the end of a coupling, whichever happens to be provided with an annular projection 11 in which to retain a sealing ring 12. The end plug constituting the present invention comprises a cylindrical sleeve 13 of sufficient length to be telescopically associated with the end of the pipe line to a point beyond the gasket 12, and an end wall 14 closing the outer end of the sleeve. The end wall is provided with a circular opening 15 which is preferably eccentrically located but which is entirely surrounded by portions of the end wall whereby a resilient grommet 16 may be seated on the rim of the opening to provide an inwardly facing valve seat. A bracket 17 is mounted on the end wall 14 and extends transversely of the opening in spaced relation to the end wall, the bracket including a tubular sleeve guide 18 which is positioned concentrically with respect to the opening 15. A valve stem 19 is slidably guided in the guide means 18, the inner end thereof extending through the opening into the interior of the sleeve and supporting a disc valve head 20 which is of larger diameter than the diameter of the opening 15 in order that a portion of the grommet may be firmly compressed between the end wall and the valve head when the valve is closed. The outer end of the valve stem is threaded and supports a nut 21 whereby the extent of inward movement of the valve may be adjustably limited. Inward movement of the valve is accomplished by a spiral spring 22 surrounding the valve stem and bearing against the valve head and a portion of the bracket 17. A lock nut 23 may be provided to maintain the adjusted position of the nut 21. Adjusting the position of the nut 21 determines the extent of opening movement of the valve, and therefore the rate of escape of the water from the interior of the pipe line when the valve is open.

Latching means is provided on the end plug to maintain the same in assembled relation with the end of the pipe line, such means preferably comprising a strip of metal bent into a U-shaped support 24 which is welded to the surface of the sleeve 13 in diametrically opposed relation to the opening 15. A pivot member 25 spans the space between the arms of the support 24 and pivotally supports a latch 26 adapted to engage a catch 28 on the end of the pipe line, such catches usually being provided in assemblages of this sort. The pivot member 25 also supports the central portion of a spring 27 having one leg hooked over the top of the latch and the other leg hooked onto one of the arms of the support whereby the latch is urged toward latching position.

Figure 3:
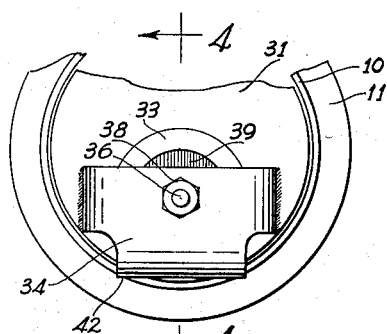
Fig. 3 is a partial end view of a modified form of the invention.
Figure 4:
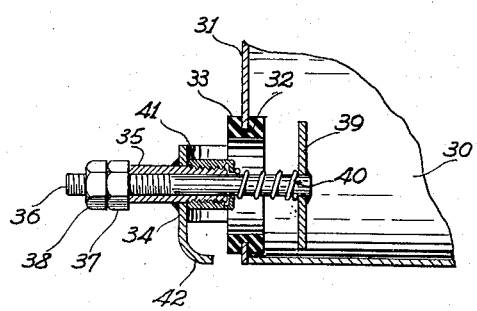
Fig. 4 is a vertical section taken substantially along line 4—4 of Fig. 3.

The modification illustrated in Figs. 3 and 4 is similar to the first form of the invention in that a cylindrical sleeve 30 is provided with an end wall 31 in which is located an eccentric opening 32, the rim of which supports a resilient grommet 33. A bracket member 34 comprises a tubular sleeve guide 35 in which is slidably mounted a valve stem 36, the valve stem being threaded for reception of an adjusting nut 37 and lock nut 38. The inner end of the valve stem carries a disc valve head 39 which is urged inwardly by a coil spring 40. The sleeve 35 is extended inwardly and is externally threaded for reception of a cap nut 41, the end of which is apertured so as to permit passage therethrough of the valve stem 36. The outer end of the spring 40 bears against the nut 41, and the position of the nut may be adjusted so as to adjust the compression of the spring 40 to determine the pressure at which the valve opens and closes independently of the adjustment of the extent of movement of the valve head 39. Another detail comprises the formation of the bracket 34 so as to include a depending, inwardly directed, tab 42 which will break up the stream of water emerging from the opening 32 and spread the same so as to prevent the formation of washout holes in the field being irrigated.

Having illustrated and described preferred embodiments of the present invention, it is to be appreciated that the same permits of modification in arrangement and detail. All such modifications as come within the scope of the appended claims are considered to be a part of my invention.

I claim:

1. An end plug for an irrigation pipe line comprising a cylindrical sleeve adapted to be telescopically associated with the end of a pipe line, an end wall closing the outer end of said sleeve, said end wall having an opening therethrough, a resilient grommet seated on the rim of said opening, a bracket mounted on the exterior surface of said end plug and extending transversely of said opening in spaced relation to said end wall, valve stem guiding means supported by said bracket, a valve stem slidably mounted for longitudinal movement in said guiding means, said valve stem extending normally to said end wall in concentric relation to said opening and extending through said opening into the interior of said sleeve, a valve head on the inner end of said valve stem, said valve head being of larger diameter than said opening and adapted to seal said opening when seated on said grommet, a spiral spring surrounding said valve stem between said valve head and said bracket and biasing said valve head inwardly from said grommet, and means to limit inward movement of said valve stem.

2. An end plug for an irrigation pipe line comprising a cylindrical sleeve adapted to be slidably telescoped with the end of a pipe line, an end wall closing the outer end of said sleeve, said end wall having an opening therethrough, a resilient grommet seated on the rim of said opening, a bracket mounted on the exterior surface of said end plug and extending transversely of said opening in spaced relation to said end wall, said bracket being of substantial width relative to the diameter of said opening and being close thereto whereby to spread the stream of water flowing through said opening, valve stem guiding means supported by said bracket, a valve stem slidably mounted for longitudinal movement in said guiding means, said valve stem extending normally to said end wall in concentric relation to said opening and extending through said opening into the interior of said sleeve, a valve head on the inner end of said valve stem, said valve head being of larger diameter than said opening and adapted to seal said opening when seated on said grommet, a spiral spring surrounding said valve stem between said valve head and said bracket and biasing said valve stem head inwardly from said grommet, means to limit inward movement of said valve stem, and latch means on said end plug for holding said end plug in operative position on a pipe line.

3. The construction set forth in claim 2 wherein said opening is eccentrically located in said end wall, said latch means is mounted on the exterior of said sleeve in diametrically opposed relation to said opening, and said bracket comprises a wide tab portion depending therefrom in the direction of eccentricity of said opening and extending toward said end wall beneath the opening when said latch means is uppermost in order to spread the stream of water laterally.

4. An end plug for an irrigation pipe line comprising a cylindrical sleeve adapted to be slid into the end of a pipe line, an end wall closing the outer end of said sleeve, said end wall having an opening therethrough, a resilient grommet seated on the rim of said opening, a bracket mounted on the exterior surface of said end plug and comprising a wide portion extending transversely of said opening in spaced relation to, and parallel to, said end wall, said wide portion lying close enough to said end wall to intercept and spread a stream of water issuing from said opening, a valve stem guiding sleeve supported by said bracket concentric to said opening, a valve stem slidably mounted for longitudinal movement in said guiding sleeve, said valve stem extending normally to said end wall in concentric relation to said opening and extending through said opening into the interior of said sleeve, a valve head on the inner end of said valve stem, said valve head being of larger diameter than said opening and adapted to seal said opening when seated on said grommet, a spiral spring surrounding said valve stem between said valve stem head and said bracket and biasing said valve stem head inwardly from said grommet, and means to limit inward movement of said valve stem, said valve stem having threads thereon, and said limiting means comprising a nut engaging the exterior end of said sleeve whereby the extent of opening movement of said valve head may be regulated.

5. The construction set forth in claim 4 in combination with adjustable means on said bracket movable longitudinally with respect to said valve stem and against which the outer end of said spring bears whereby the compression thereof may be adjusted independently of adjustment of the extent of movement of said valve head.

6. An end plug for an irrigation pipeline adapted for association with the end of a pipe having a catch uppermost thereon, comprising a cylindrical sleeve adapted to be partially telescoped with the end of the pipeline, a latch mounted on said sleeve for cooperation with said catch to retain said sleeve against endwise disassociation from the pipeline and with said latch uppermost, an end wall closing the outer end of said sleeve, said end wall having an opening therethrough eccentrically located so as to lie lowermost when said latch is associated with said catch, a resilient grommet seated on the rim of said opening, a wide, U-shaped strap mounted on the exterior surface of said end wall and including a central portion lying parallel to said end wall outwardly from said opening but close enough to intercept and spread a stream of water issuing from said opening, a valve stem guiding sleeve mounted upon said strap in concentric relation to, and outwardly from, said opening and extending outwardly and inwardly from said strap, a valve stem slidably mounted for longitudinal movement in said guiding sleeve, said valve stem having a threaded end extending outwardly from said guiding sleeve and an inner end extending inwardly from said guiding sleeve through said opening, a limiting nut mounted on the threaded end of said valve stem and engageable with the outer end of said guiding sleeve, the inwardly projecting end of said guiding sleeve being threaded, a centrally apertured cap nut threadedly mounted on the threaded inner end of said valve sleeve, a valve head mounted on the inner end of said valve stem and adapted to seal said opening when seated on said grommet, and a spiral spring surrounding said valve stem and compressed between said valve head and said cap nut, said spring effecting opening movement of said valve stem, said limiting nut adjustably determining the extent of opening movement of said valve stem, and said cap nut adjustably determining the compression of said spring whereby to determine the pressure at which the valve opens and closes independently of the adjustment of the extent of movement of the valve stem.

OREN O. BEYMER.

References Cited in the file of this patent

UNITED STATES PATENTS

| Number | Name | Date |
|---|---|---|
| 443,952 | Baguley | Dec. 30, 1890 |
| 806,331 | Ferry | Dec. 5, 1905 |
| 1,163,128 | Brauer | Dec. 7, 1915 |
| 1,946,872 | Muhleisen | Feb. 13, 1934 |
| 2,187,119 | Fish | Jan. 16, 1940 |
| 2,204,757 | Henze | June 18, 1940 |